Oct. 8, 1957          C. L. SWANTON          2,809,284
RAILWAY SWITCH MACHINE CONTROL CIRCUIT

Filed Dec. 5, 1952          4 Sheets-Sheet 1

INVENTOR.
C.L.SWANTON

BY Forest B. Hitchcock
HIS ATTORNEY

Oct. 8, 1957 C. L. SWANTON 2,809,284
RAILWAY SWITCH MACHINE CONTROL CIRCUIT
Filed Dec. 5, 1952 4 Sheets-Sheet 2
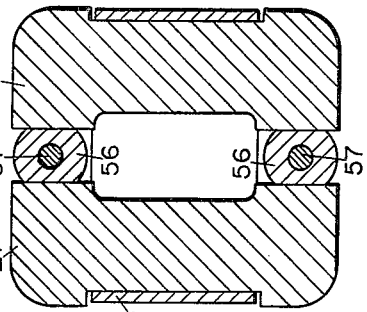
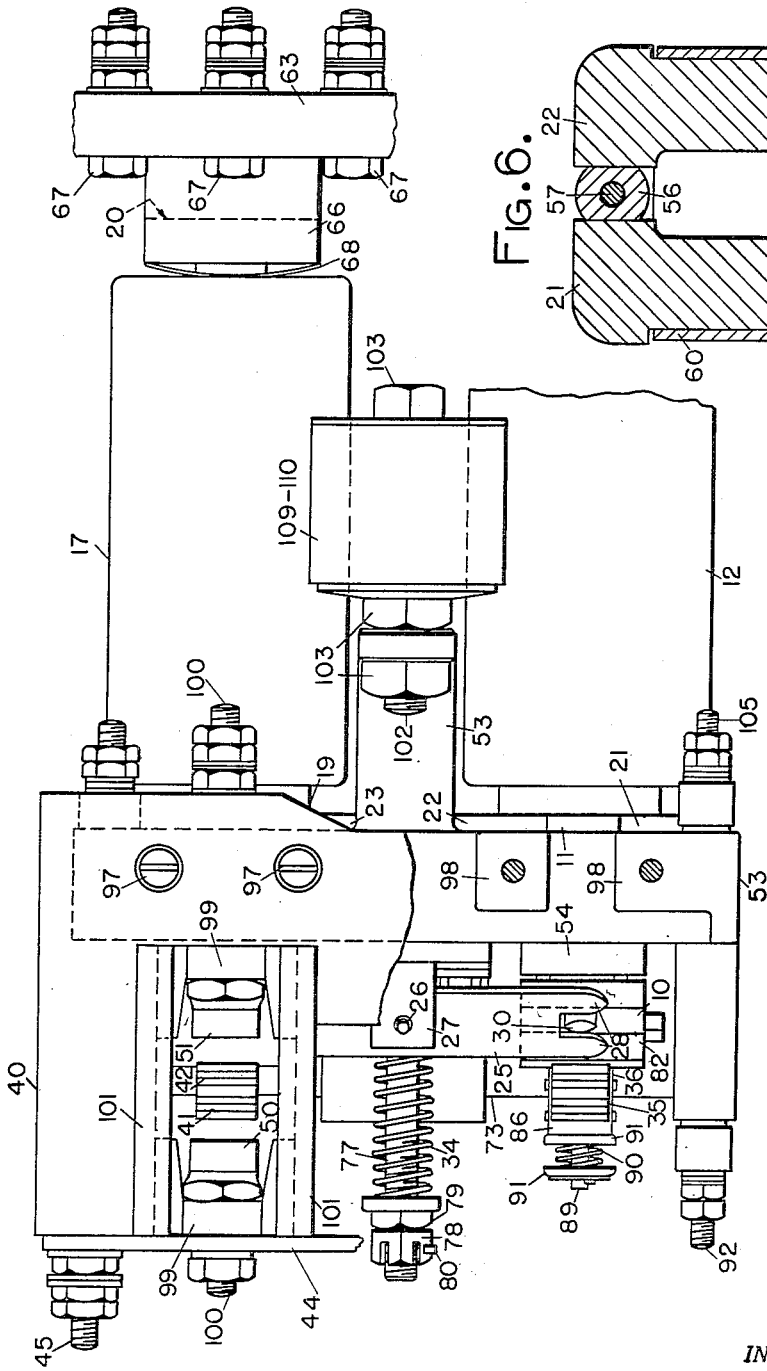
INVENTOR.
C. L. SWANTON
BY Forest B. Hitchcock
HIS ATTORNEY Oct. 8, 1957    C. L. SWANTON    2,809,284
RAILWAY SWITCH MACHINE CONTROL CIRCUIT
Filed Dec. 5, 1952    4 Sheets-Sheet 3
Fig.3.
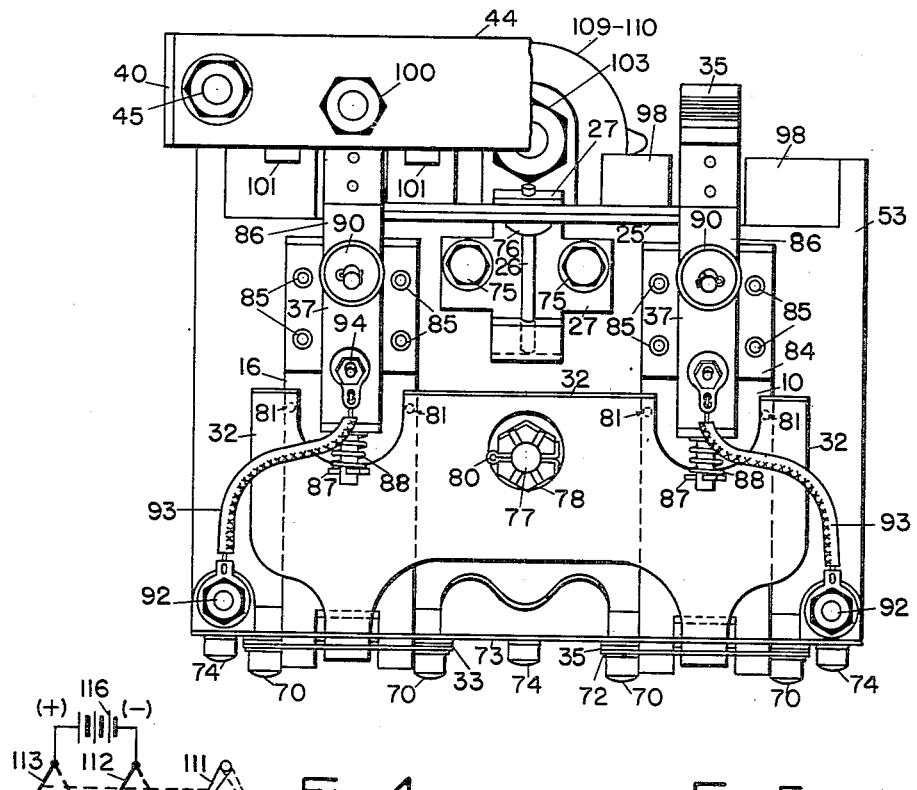
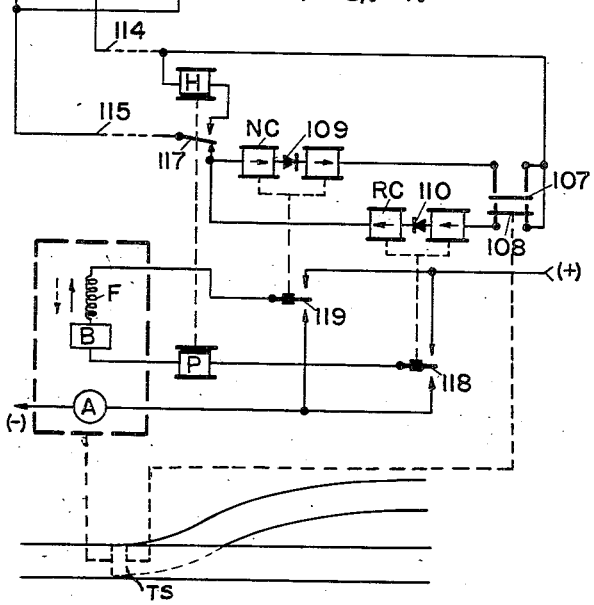
Fig.4.
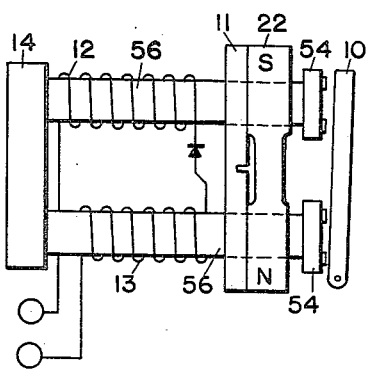
Fig.5.
INVENTOR.
C. L. SWANTON
BY Forest B. Hitchcock
HIS ATTORNEY Oct. 8, 1957     C. L. SWANTON     2,809,284

RAILWAY SWITCH MACHINE CONTROL CIRCUIT

Filed Dec. 5, 1952     4 Sheets-Sheet 4

INVENTOR.
C. L. SWANTON

BY Forest B. Hitchcock

HIS ATTORNEY

United States Patent Office 2,809,284
Patented Oct. 8, 1957

2,809,284

RAILWAY SWITCH MACHINE CONTROL CIRCUIT

Charles L. Swanton, North Chili, N. Y., assignor to General Railway Signal Company, Rochester, N. Y.

Application December 5, 1952, Serial No. 324,210

10 Claims. (Cl. 246—219)

This invention relates to railway switch machine control circuits including local controllers, and more particularly pertains to a control circuit organization of the type employing tractive type polar relays having interlocked armatures.

This application is a continuation in part of my copending application Ser. No. 91,449, filed May 5, 1949, which has resulted in Patent No. 2,644,120, dated June 30, 1953, and entitled Railway Switch Machine Controller. The parent application discloses and claims the structural characteristics of a polarized mechanically interlocked controller; whereas, this continuation in part application discloses and claims the characteristic features of a control circuit organization involving such a polarized mechanically interlocked controller.

In controlling railway switch machines remotely by means of line wires it is desirable to use polarized control of the switch machine because of the many advantages inherent in this type of control. As a result, switch machine controllers of the prior art have been devised which include a polar relay whose function it is to energize the switch machine in accordance with the polarity of the voltage applied to the line wires. Obviously, such an arrangement is not fully satisfactory since it not only requires the use of such an additional polar relay but also requires that a substantial amount of power be supplied to the line wires to hold such relay energized in the event that it is considered desirable to have a normally energized switch controller circuit. In view of these disadvantages of switch machine controllers of the prior art, the controller of the present invention has been devised which can be used in polarized control circuits but which does not require the use of an additional polar relay. The switch controller of the present invention includes two interlocked contactors and the circuit organization is so arranged in conjunction with two rectifiers as to consume a minimum of power when used in a normally energized circuit.

Since it is also considered desirable in devices of this type to provide some means for interlocking the two contactors in order to provide the utmost safety precautions, another feature of the present invention may be said to be an improved means for providing this interlocking.

Other objects, purposes, and characteristic features of the present invention will be in part obvious from the accompanying drawings, and in part pointed out as the description of the invention progresses.

In describing the invention in detail, reference will be made to the accompanying drawings, in which like reference characters designate corresponding parts throughout the several views and in which:

Figs. 1, 2 and 3 illustrate side, top and front views respectively of the switch machine controller of the present invention;

Fig. 4 is a schematic diagram of a typical circuit employing the switch controller of the present invention;

Figure 1:
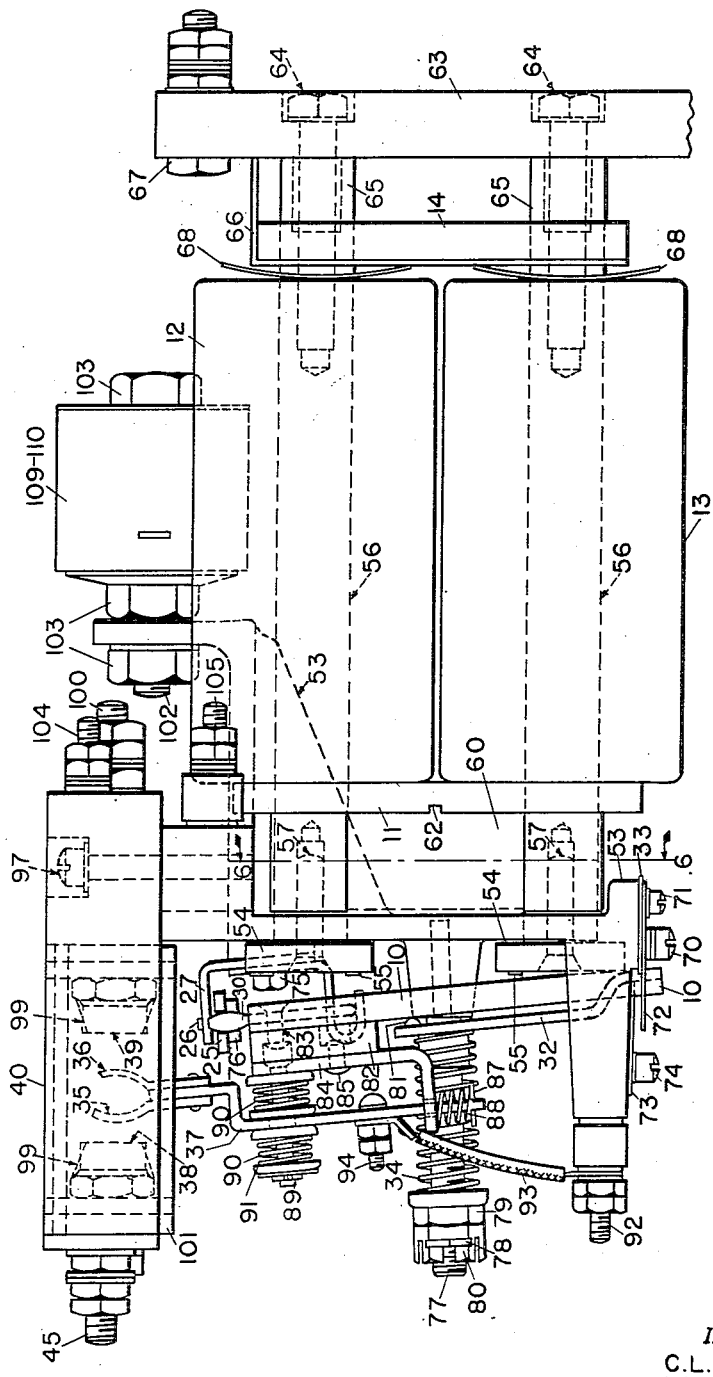
Figure 7:
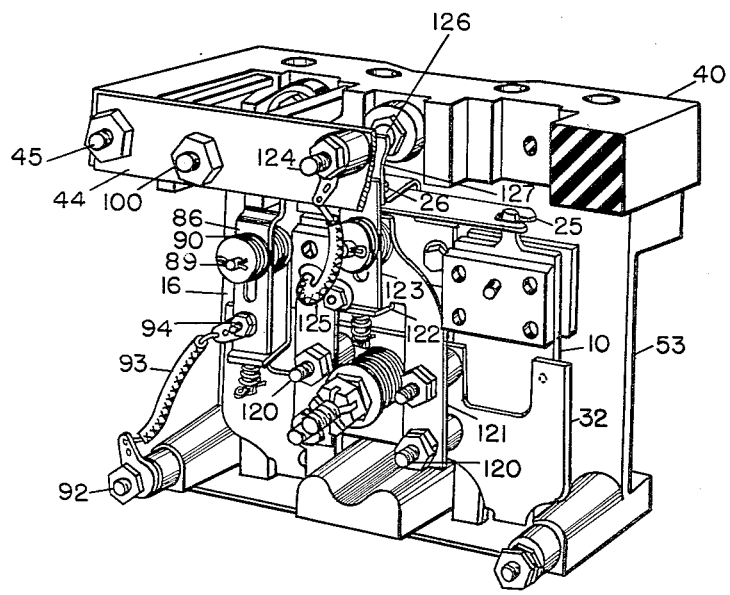
Figure 8:
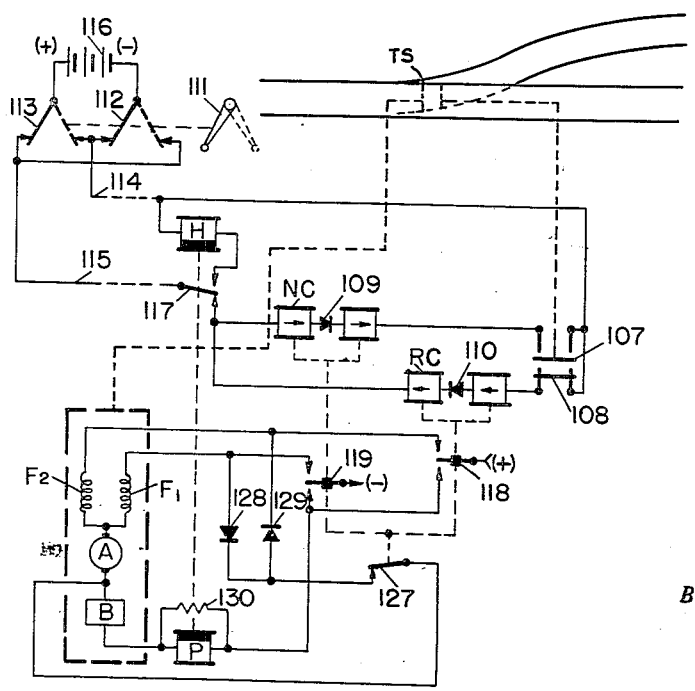

Fig. 5 diagrammatically illustrates the magnetic circuit of each of the tractive type relays included in this switch controller;

Fig. 6 illustrates the arrangement of the permanent magnets with respect to the core pieces about which they fit;

Fig. 7 is an isometric view of a modified form of the switch machine circuit controller shown in Figs. 1, 2 and 3; and Fig. 8 is a schematic diagram of a typical circuit employing the modified switch machine circuit controller of Fig. 7.

For the purpose of simplifying the illustration and facilitating in the explanation, the various parts and circuits constituting the embodiment of the invention have been shown diagrammatically and certain conventional illustrations have been employed, the drawings having been made more with the purpose of making it easy to understand the principles and mode of operation, than with the idea of illustrating the specific construction and arrangement of parts that would be employed in practice. Thus, in the schematic diagram of Fig. 4 the contactors and their contacts are illustrated in a conventional manner, and symbols are used to indicate connections to the terminals of batteries, or other sources of electric current, instead of showing all of the wiring connections to these terminals.

Without attempting at this point to define this invention in exact detail, it can be seen from the accompanying Figs. 1, 2 and 3 that there are two independent magnetic circuits each of which includes two coils wound around cylindrical cores, an armature, yoke, permanent magnets, a leakage strip, and a rectifier. The magnetic circuit associated with the armature 10, for example, includes the leakage strip 11, permanent magnets 21 and 22, the coils 12 and 13, and yoke 14. The rectifier unit 109—110 actually comprises two separate rectifiers and one of these rectifiers is includes in the electrical circuit for each pair of coils as will subsequently be brought out. Similarly, the magnetic circuit associated with the armature 16 includes two coils 17 and 18, leakage strip 19, yoke 20, and two permanent magnets which are mounted adjacent the cores associated with coils 17 and 18 in the manner shown in Fig. 6. The armatures 10 and 16 are both pivoted at their bottom upon the projecting edge of the plate 33. Each of these magnetic circuits operates so as to attract its associated armature whenever the series connected coils of that magnetic circuit are energized with a voltage of proper polarity as will later be more fully explained.

Mechanical means for interlocking the armatures are provided by means of the arm 25 which is free to rotate about its center pin 26 in the bracket 27. Each end of this arm 25 has an open ended slot such as at 28 in Fig. 2 so that upwardly projecting pins such as 30 on the top of the armatures can fit into these slots 28 in the arm 25. Thus, when either armature is revolved in a particular direction about its pivot, the other armature is rotated through the same angle in the opposite direction.

The centering device which acts to position the armatures 10 and 16 when they are both deenergized consists of a pressure plate 32 which is pivoted upon the projecting edge of the plate 33 and spring biased by means of the spring 34 so as to press against both armatures 10 and 16 when they are in their neutral positions. Since movement of either armature towards its associated core will cause the other armature to move away from the core, the pressure plate 32 will then be pushed outward by such outwardly moving armature and will cause the spring 34 to compress further. Obviously, therefore, when both armatures 10 and 16 are deenergized, they will move to the positions where the pressure plate 32 will exert equal forces upon each armature and in that position the spring 34 will be compressed the least.

Contacts 35 and 36 are mounted to the upper portion of contact arm 37 associated with armature 10 and cooperate with corresponding contacts 38 and 39 respectively mounted onto the contact block 40. Similarly contacts 41 and 42 mounted on a similar contact arm 37 of armature 16 cooperate with contacts 50 and 51 respectively also located on the contact block 40.

Having thus described the mode of operation of the present invention in a general manner, a more detailed description will now be given of its various components and how they cooperate one with another. Beginning with the bracket 53, it can be seen that four rectangularly shaped core heads 54 are mounted upon one face of this bracket by means of the rivets 55 in such a manner that countersunk holes in these core heads are aligned with corresponding holes of larger diameter in the bracket. Into these four larger holes in the bracket 53 are fitted four cylindrically shaped core pieces 56 and these are firmly held to the bracket by means of screws 57 which pass through the core heads 54 and into the tapped holes in the ends of the core pieces 56. Although these core pieces are generally of circular cross-section as has been mentioned, they have been provided with flattened surfaces over the portions which are adjacent to the bracket. The reason for so shaping these core pieces is apparent from an examination of Fig. 6 which is a cross-sectional view of two of these core pieces taken along the line 6—6 in Fig. 1. In this Fig. 6, permanent magnets 21 and 22 have been shown placed about the core pieces 56 and, by flattening the sides of these core pieces as shown a greater area of contact is provided between the core pieces and the magnets. A clamp 60 formed of resilient material firmly holds the permanent magnets 21 and 22 adjacent the core pieces 56. A similar arrangement is provided for the two core pieces associated with the coils 17 and 18 which have not been shown in this partial cross-sectional view.

A leakage strip provided with a notch is mounted onto each pair of cores. Thus, the leakage strip 11, having a notch at 62, has two circular holes cut through it so that it can fit over the core pieces 56 associated with coils 12 and 13. A yoke such as the yoke 14 is associated with each pair of coils and completes the magnetic circuit for those coils. A terminal board 63 is attached to the cores by means of bolts 64 passing through the terminal boards into tapped holes in the ends of the cores. The spacers 65 provide the proper amount of separation between this terminal board 63 and the four coils, and the insulating plates 66 insure that a short circuit will not result from the connections made to the terminal posts 67 on the top of the terminal board 63. The spring washers 68 are located between the coil ends and the insulating plates 66 and provide that the coils will be tightly held onto the assembly.

Figs. 1 and 2 illustrate that the plates 33 mounted upon the bottom of the bracket 53 by means of screws 70 and 71 serve as a bearing for the armatures 10 and 16 and pressure plate 32. Thus, these armatures and the pressure plate are each provided with a slot into which fit the projecting edges of these bearing plates 33. The armatures are held onto these projecting edges of the plates by means of a retaining plate 72 which fits around the bottom portion of the armatures 10 and 16 and holds them in place. An additional retaining plate 73 is provided and is held onto the bracket 53 by means of screws 74 and this retaining plate 73, in a similar manner, insures that the pressure plate 32 will remain in position with respect to the projecting edges of the bearing plates 33. By means of this arrangement, both the armatures 10 and 16 and the pressure plate 32 are hinged about their bottom portion.

The bearing bracket 27 is held by means of screws 75 onto a downward sloping surface of the bracket 53. This bearing bracket 27 has two concentric holes and into these holes fits the bearing pin 26. The bottom portion of this bearing pin 26 rests upon the lower edge of the bearing bracket 27 and has a circular portion 76 of greater diameter which provides a means of support for the arm 25 fitting over the top of this pin 26 and soldered thereto. The arm 25 and pin 26 are thus free to rotate in the bracket 27. Two open-ended slots 28 are located at the ends of the arm 25 and an upwardly projecting pin 30 from each of the armatures fit into these slots 28. Thus, it will be seen that as either armature 10 or 16 is attracted towards its associated core head 54, the arm 25 will rotate about its pin 26 and cause the other armature to be moved in the opposite direction thereby providing an interlocking of these two armatures for, as one armature closes its front contact, the other armature will always be positioned so as to close its back contact.

The pivoted pressure plate 32 is positioned by means of the spring 34 which fits over the projecting stud 77 on the bracket 53. This spring 34 is held in place by means of the two nuts 78 and 79 which fit over the threaded portion of this projecting stud 77. It will be noted that the outer nut 78 is slotted and that there is a hole drilled through this projecting stud 77 so that when the proper spring compression is obtained, this nut 78 may be locked into place by means of a cotter pin 80 passing through the slots in the nut 78 and the associated hole in the threaded stud 77. The compressive force of the spring 34 causes the pressure plate 32 to exert a force against the armatures 10 and 16 as has been described. It will be noted that rivets 81 have been placed through the upper portion of the pressure plate 32 and that the projecting heads of these rivets contact against the armatures 10 and 16. With pressure plate 32 pressing with equal force against both armatures in the normal deenergized condition, they are both held in their neutral position as illustrated in Fig. 1. As has been described, movement of either armature towards its associated core head will cause the other armature to move away from its associated core head because of the interlocking arrangement which is provided. The pressure plate 32 will then exert a greater force against this other armature so that when both armatures are released, they will immediately be restored to the position shown in which the pressure plate is in contact with both armatures 10 and 16.

The contact block 40 is mounted onto the bracket 53 by means of screws 97 which fasten into the threaded holes in the bosses 98 formed on the top of the bracket 53. In Fig. 2 a portion of this block 40 has been cut away to show more clearly the manner in which the armatures 10 and 16 are interlocked. Permanent magnets 99 are fastened to the block 40 by means of the studs 100 which pass through a corresponding hole in these magnets. The contacts 38, 39, 50 and 51 are also mounted at the ends of these studs 100. In Figs. 2 and 3, it can be seen that the open ends of block 40 are closed in by a conducting metal strip 44 which is fastened by stud bolts 45 (one at each end) to the block 40 and which bolts 45 also serve as terminal posts. It is noted that metal strip 44 also supports two studs 100 upon which the back contacts 50 and 38 are mounted. This conductively connects the two back contacts 50 and 38 as required by the circuit of Fig. 4, later to be described. Thus, the studs 45 can be used as terminals for the back contacts 50 and 38. These permanent magnets 99 are so placed with respect to these front and back contacts as to provide magnetic blow-out of an arc produced by the opening of these contacts. Ceramic insulators 101 mounted to either side of these contacts provide insulation for the block 40 and prevent it from becoming overheated as the result of electrical arcing.

A block of insulating material 82 is attached to each armature by means of rivets 83. The armature brackets 84 are then mounted onto the opposite faces of each of these insulating blocks 82 by means of additional rivets 85. Contact arms 86 having a narrowed bottom portion fit into a corresponding hole in each armature bracket 84. Pins 87 fitting into holes cut into the bottom of each contact arm 86 hold the compressed springs 88 in place. The studs 89 riveted onto the armature brackets 84 pass through holes in the contact arms 37, and springs 90 are mounted on each side of this contact arm with washers 91 as shown. As has already been described, two contacts are riveted to the upper portion of each contact arm 37 and power is supplied to these contacts by attaching a wire to each binding post 92 from which place an insulated wire 93 leads to each binding post 94 on the contact arms 37. The contact arms 37 and armature brackets 84 are electrically insulated from the rest of the device by means of the insulating blocks 82.

Because of the manner in which each contact arm 37 is mounted with respect to its armature bracket 84, the entire contact arm 37 is free to rotate through a small angle about the point at which the contact arm 37 butts against its armature bracket 84. This arrangement insures that the proper pressure will be applied by the contacts as each armature makes either its front or back contacts. Thus, if the armature 10 is attracted toward its associated core head 54 by the energization of the windings 12 and 13, the front contacts 36 and 39 will be closed before the armature 10 is actually in its fully attracted position. Then as the armature 10 continues its travel toward its fully attracted position, the contact arm 37 of this armature 10 is rotated about its pivoted point against the compressive force of one of the springs 90 thereby causing a force to be applied between these front contacts. Similarly, as the other armature 16 simultaneously closes its back contacts 41 and 50, a force is applied to these contacts.

The unit 109—110 comprises two rectifiers and is mounted upon an extending arm of the bracket 53 by means of the stud 102 and the nuts 103. Two insulated binding posts 104 and 105 are provided and are attached to the block 40 and to the bracket 53 respectively. The reason for providing these insulated binding posts as shown will later be more fully described.

The magnetic circuit associated with the armature 10 has been shown schematically in Fig. 5. Thus, there is shown in this drawing the cores 56, windings 12 and 13, yoke 14, leakage strip 11, and core heads 54. A tractive type polar relay having a magnetic circuit of this type is shown in the Patent No. 2,414,583 to Duffy, dated January 21, 1947. The function of the slot in the leakage strip 11 is shown and described in the Patent No. 2,502,811 to Duffy and Willing, dated April 4, 1950. Since this type of magnetic relay has been fully shown and described in the above references, no detailed explanation will be given in the present application. It should be understood, however, that no claim is intended to be made herein to any material disclosed and claimed in the prior patents listed above.

Fig. 4 shows the circuit organization provided for controlling a switch machine by means of the controller of the present invention. It will be assumed in this discussion of the circuit of Fig. 4 that the contactor NC corresponds to the armature 10 and its associated contacts; whereas, the contactor RC then corresponds to the armature 16 and its associated contacts. The contactors NC and RC of Fig. 4 are illustrated as controlling a suitable electric switch machine SM, which in turn operates the points of a track switch TS. In this drawing the switch machine SM has been shown schematically by the motor armature A, series field F, and brake B. This brake B is of the friction type and is controlled so as to exert a braking effect whenever the current to the switch motor is interrupted. The switch machine also includes point detector contacts 107 and 108 which open and close under certain conditions as will presently be described. The circuit for this switch controller includes, in addition to the interlocked contactors NC and RC, a rectifier 109 and 110 included between each pair of windings of each of the contactors and also includes the holding and pick-up windings H and P respectively, of an overload relay. The contactor NC is energized and its front contact closed during operation of the switch from the reverse to the normal position and; conversely, the contactor RC has its front contact closed during operation of the switch from its normal to the reverse position. The point detector contactor 107 included in series with the contactor NC is open only when the switch is in its full normal position; whereas, the similar contact 108 is open only when the switch is in its full reverse position. The two rectifiers 109 and 110 are preferably connected between the contactor windings as shown so that they will be protected from lightning by the inductive effect of each of these windings. The two binding posts 104 and 105 previously mentioned and shown in Fig. 1 are for the purpose of connecting the windings 12 and 13 and the rectifier 109 in series shown in Fig. 4. Thus, simply by connecting a terminal of one coil and one terminal of the rectifier 109 to one insulated binding post and connecting one terminal of the other coil and the remaining terminal of rectifier 109 to the other insulated binding post, a circuit is provided between the two remaining coil terminals which includes both coils with rectifier included between. A similar arrangement is provided for the contactor RC and two similar binding posts are provided on the other side of the mechanism for this purpose.

A form of pole changing apparatus has been schematically shown in this Fig. 4 and includes the lever 111 having contacts 112 and 113 and the battery 116. Obviously, as shown the voltage applied to the line wires is such as to make the line wire 114 negative with respect to the line wire 115. When the lever 111 is moved to its dotted line position, however, the line wire 114 becomes positive with respect to line wire 115. Although this control mechanism has been shown as consisting of a manually operable lever, it should be understood that any other suitable means, either manual, semi-manual, or automatic for changing the relative polarity of the line wires might be used.

As may be ascertained from the above description, Fig. 4 shows the condition of the controller when the switch is in its full normal position because the point detector contact 107 is shown open. Then with the polarity applied to the line wires as shown, a current flows through back contact 117 of the overload relay, the windings of the contactor RC, rectifier 110, and closed point detector contact 108. However, since this current is required to flow in the reverse direction through the rectifier 110, this rectifier acts as a large resistance and holds the current to a very small value, approximately of the order of four milli-amperes. The primary function of the rectifier is to limit current consumption and not to prevent actuation of its associated contactor although it also performs this latter function. To provide the greatest safety, the circuit associated with each contactor is so arranged that even a large value of current flowing through the windings in a direction opposite to that indicated by the arrows in the contactor symbols in Fig. 4 will not actuate that contactor even though the amount of current is many times the normal pick-up current.

If now the lever 111 is moved to its dotted line position, the polarity of the voltage applied to line wires 114 and 115 will be reversed with the result that the current flowing through the rectifier 110 will encounter the forward resistance of this rectifier. This resistance is of a relatively small value so that the current will now rise to such a magnitude and be of the proper polarity to energize the contactor RC. As a result, front contact 118 of this contactor RC will close and, because of the mechanical interlocking, back contact 119 of contactor NC will simultaneously be closed. The switch motor will then be energized through a circuit from (+), front contact 118 of contactor RC, the pick-up winding of the overload relay, the brake B, field F, back contact 119 of contactor NC, the motor armature A, to (—). It will be noted that under these conditions the current flowing through the motor field F is of the direction as shown by the solid line arrow adjacent the field winding. The switch motor when thus energized operates the switch points to their reverse position.

As soon as the switch points move from the normal position the point detector contact 107 closes and, as has been stated, the contact 108 remains closed until the switch is in its full reverse position. When the switch has finally been moved to its reverse position, the point detector contact 108 opens thereby interrupting the circuit to the contactor RC. Since the contact 107 is now closed, the contactor NC will now be connected across the line wires 114 and 115 through the back contact 117 of the overload relay but the current will be of such a direction through this contactor NC as to keep it deenergized. Also, the contactor current will now encounter the back resistance of the rectifier 109 so that this current will be held to a very small value. Thus, both contactors will be deenergized and will be in their neutral positions so that the motor will be deenergized. Consequently, the mechanical brake B will be applied and will prevent creeping or other undesired motion of the switch.

If the lever 111 is now returned to its solid line position, the polarity of the voltage applied to line wires 114 and 115 will again be reversed and, as a result, the current flowing through the windings of the contactor NC will be increased and the polarity will be such as to allow this contactor to become energized. For this reason, front contact 119 of this contactor NC will be closed and back contact 118 of contactor RC will simultaneously be closed. The switch motor will then be energized through a circuit from (+), front contact 119 of contactor NC, the motor field F, brake B, pick-up winding P of the overload relay, back contact 118 of contactor RC, the motor armature A, to (—). It will be noted that in this case the current flowing through the motor field F is in the direction indicated by the dotted line arrow adjacent the field F. This reversal of current through the field causes the direction of operation of the motor and thus of the switch points to be reversed so that the switch will now be operated to its normal position. In a similar manner, as the switch reaches its normal position, the point detector contact 107 will open and cause the deenergization of contactor NC with the result that the switch motor will become deenergized and the brake B will again be applied.

As has been explained, both contacts 107 and 108 are closed during actual operation of the switch from one position to another. Because of this feature, the direction of switch movement can be reversed during midstroke since either contactor NC or RC can then be energized simply by reversing the polarity of the voltage applied to the line wires 114 and 115.

With respect to the operation of the overload relay it will be noted that this relay includes two separate windings H and P which represent the hold winding and pick-up winding of this relay respectively. If, for instance, the operation of the switch from one position to another is obstructed so as to cause the motor current to rise to an abnormally high value, the current through the winding P will then be of sufficient magnitude to cause the energization of this overload relay with the result that the back contact 117 will open thereby deenergizing both contactors NC and RC. In this condition, both of these contactors will be operated to their neutral position thereby deenergizing the switch motor. Moreover, the closing of front contact 117 of this overload relay then connects the hold winding H directly across the line wires 114 and 115 so that the overload relay remains energized and its back contact 117 open as long as a voltage is applied to these line wires 114 and 115. Thus, in order to restore the circuit to its operating condition it is necessary to open the circuit to the line wires 114 and 115 to allow the deenergization of the winding H.

The switch machine controller of Figs. 1, 2 and 3 is shown in a modified form in the isometric view of Fig. 7. The same basic structure is employed with the frame 53 having mounted thereon the insulating block 40 with a metal strip 44 mounted across the open ends of the insulating block 40 and attached thereto by studs 45, one at each end. There are two separate electromagnets which respectively have the same armatures 10 and 16 which are mechanically interconnected by the arm 25 pivoted at pivot point 26.

These two armatures 10 and 16 are held in mid positions where their respective contacts are in noncontacting positions with respect to their front and back points such as 38 and 39 (see Fig. 1). This is effected by the pressure plate 35 which is pivoted at its lower end and is held against both armatures by the spring 34 (see Fig. 1). Thus, when either armature 10 or 16 is actuated to an energized position, the arm 25 transfers this movement to the other armature to move it away from its cooperating pole pieces. Such motion of the other armature causes the pressure plate 32 to be pushed outwardly against the pressure of spring 34. This structure will not be discussed further, since it has been fully described above in connection with the main form of the invention.

The feature of Fig. 7 resides in the addition of a contact mounted on the pressure plate 32. Referring to Fig. 7, it can be seen that a U-shaped member 121 is mounted to the pressure plate 32 by being supported upon four insulated studs 120. These insulated studs 120 and also 124 are composed of two special head screws molded into a section of Bakelite but with the screws separated from each other. Thus, the member 121 is wholly insulated from the pressure plate 32. For this reason, the member 121 is wholly insulated from the pressure plate 32.

The member 121 is of a general inverted U-shape with an extending upper portion for mounting a contact finger 123. At the middle portion of the inverted U-shaped member 121, a laterally extending projection 122 is provided for mounting the contact finger 123. This contact finger 123 is constructed and mounted to the member 121 in exactly the same way that the contact finger 37 is mounted to the support bracket 84 (see Fig. 1). For this reason, it is believed to be unnecessary to discuss in detail the pivot spring mountings and centralizing spring, such as springs 90, and the like. The contact finger 123 extends upwardly and has a contact tip or point 127 which cooperates with a fixed contact point 126. The fixed contact 126 is mounted to the block 40 by a suitable stud bolt (not shown).

When both armatures 10 and 16 are in mid-positions with their respective electromagnets deenergized, the pressure plate 32 is then in the position to cause the contact finger 123 and its contact point 127 to make contact with the point 126; but when either armature 10 or 16 is actuated to an energized position the pressure plate 32 and contact finger 123 are moved outwardly from the base structure 53 so that contact is broken as between the contact point 126 and the movable contact point 127.

The contact finger 123 has a flexible lead connected to a stud 124 which is of the insulated type above described. This provides a terminal, insulated from the connecting strip 44, to which connection may be made for finger 123. The other side of the circuit can be connected to contact point 126 in back of the insulated block 40. A circuit connected to these terminals is normally closed, but is always opened whenever either armature is operated to an energized position.

*Typical circuit of Fig. 8*

This circuit organization of Fig. 8 is arranged to employ the modified controller of Fig. 7. The switch machine control lever 111 operates the contacts 112 and 113 to supply energy of one polarity or the other from the battery source 116 to the line wires 114 and 115 in the same way as previously described. The overload relay is provided with two windings H and P. The stick winding H has one side connected to the wire 114 and the other side connected to the front point of the overload relay so that it will be connected to the wire 115 if and when the front contact 117 is closed.

Normally the overload relay is deenergized and the wire 115 is connected through back point 117 to the terminal of the switch circuit controller having both electromagnetic NC and RC directly connected thereto. These electromagnets are polarized and have their windings connected in exactly the same way as discussed in connection with Fig. 4 with the rectifier units 109 and 110 connected between their pairs of coils so that very little or substantially no energy flows when the switch is in correspondence with the then existing position of the control lever 111.

The position of the switch points and switch machine (not shown) is indicated by the contacts 107 and 108. These contacts are shown in the positions which they assume when the switch points are in their full normal position and locked; but when the switch machine is unlocked and is in operation these contacts 107 and 108 assume mid-positions. On the other hand, when the switch points are in their full reverse positions and locked by the switch machine, the contacts 107 and 108 are in their reverse positions. However, it should be noted in this connection that these contacts assume their full normal and full reverse positions when the switch machine has operated the track switch points to such full normal and reverse positions respectively and has locked them, but this operation is completed prior to the switch machine mechanism reaching the end of its operating stroke so that the respective contactor NC or RC is deenergized in time to allow dynamic braking of the switch motor and bring it to rest before the actual end of the stroke is reached, and before any damage can be done to the operating mechanism.

Referring to Fig. 8, it will be seen that the normal and reverse controllers NC and RC are provided with the same contacts 119 and 118 respectively, but in addition, the contact 127 is shown as controlling the dynamic braking circuits. This includes two rectifier units 128 and 129 which are connected to the wires leading to the two field windings F1 and F2 of the motor.

It will thus be noted that the switch motor in this form of Fig. 8 has the same armature A and electromagnetic brake B but is provided with the two field windings F1 and F2 instead of a single series field winding F of Fig. 4. The energization of the reverse controller RC causes the energization of the field winding F2 to cause operation of the switch motor in such a direction as to operate the switch machine and associated switch points to their reverse positions. Similarly, when the switch points are in their reverse positions, the energization of the normal controller NC causes the energization of the field winding F1 to operate the switch motor in such a direction as to move the switch points to their normal positions. In other words, these two field windings have the relationships of the usual split field windings, the opposite halves of which are for respectively causing opposite directions of rotation. This can be readily seen in Fig. 8 because the picking up of contact 118 to its front point applies (+) to the wire leading to the field winding F2, and this operation of contact 118 causes the contact 119 to be moved to its back point position for applying (—) to the wire leading to the coil P of the overload relay which in turn is connected to the electromagnetic brake and armature A. When the electromagnet NC is energized, the operation is just the opposite so that the field winding F1 is energized.

In both instances, as above described in connection with Fig. 7, the contact 127 is opened so that during the operation of the switch motor the dynamic snubbing circuit is open. Also, it can be seen that when the front contact 118 applies (+) to the field winding F2, this energy cannot flow to the field winding F1 because the rectifier unit 129 is poled in the opposite direction as is also the rectifier unit 128. The same situation exists when a normal operation is called for, closing front contact 119 and back contact 118, because the flow of current in such instance is in a direction opposite to that for which the rectifier units 128 and 129 are connected. For this reason, these rectifier units 128 and 129 do not short circuit the field windings F1 and F2.

When the switch machine approaches the end of its operating stroke and deenergizes the particular circuit controller NC or RC which has been energized, the back contact 127 is closed to complete the dynamic braking circuit. If the switch motor field winding F2 is energized for reverse operation, then the deenergization of such circuit causes the field winding F1 to have a current flow through it in a direction that will pass through rectifier 128 and to the armature A to give a dynamic snubbing effect. Similarly, if the switch motor field winding F1 is energized for normal operation, and such energy is removed near the end of that operating stroke, the deenergization of normal contactor NC causes the closure of back contact 127 and a current to be generated in the field winding F2 which flows in such a direction as to pass through the rectifier 129 to create a dynamic braking effect. Thus, the rectifiers 128 and 129 are poled in the proper direction to allow the flow of dynamic braking current, but to block the flow of operating current as between the two field windings.

The winding P of the overload relay has shunted across it a resistance 130 which is merely for the purpose of making this overload relay slower in response to overload conditions. It is also noted that this overload circuit connection is excluded from the dynamic braking circuit as is also the electromagnetic brake B. This provides that the electromagnetic brake B is deenergized and can release to hold the motor and switch machine in an operated position after it has been brought to rest by the dynamic braking. Such operation involving the dynamic braking considerably lengthens the life of the associated electromagnetic brake B.

SUMMARY

By means of the present invention polar control of a switch machine is obtained while yet requiring only a very small amount of current when used in a normally energized circuit. Since these contactor windings have a low duty cycle in that they are fully energized only a very small portion of the time, they can obviously be designed to carry a large amount of current when they are energized without overheating and, as a result, proper operation of these contactors will be obtained even when the line voltage drops to a fairly low value.

It may be said then that the switch machine controller of the present invention not only operates in an improved manner but also requires the expenditure of less equipment. The utmost in safety precautions has been included in that proved polar magnetic relay structures have been employed having two armatures and an improved means has been devised for mechanically interlocking these armatures. In addition, the circuit described permits operation with a minimum of power and yet allows instant and positive operation of the switch to either position.

The present invention as shown in the modified structure also makes provision for a unitary contact which is operative to control a dynamic braking circuit regardless of whether the normal or reverse operating electromagnet is energized. This unitary contact is employed in connection with two rectifier units for governing the snubbing or dynamic braking circuit of the switch machine motor having two field windings. This provides a simple and efficient organization effective to reduce the wear and tear on the associated electromagnetic brake.

Having thus described a switch machine controller as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice without in any manner departing from the spirit or scope of the present invention.

What I claim is:

1. In a controller for operating a switch machine, line wires for operating said switch machine controller from a remote location, two polar contactors selectively connected across said line wires and selectively energized in accordance with the polarity of energization applied to said line wires, mechanical interlocking means for causing either of said contactors to close its back contact when the other of said contactors is energized to close its front contact, switch points associated with said switch machine and selectively operated to either of two positions in accordance with the selective energization of said contactors, a rectifier included in series with each of said contactors, whereby a current flowing through either of said polar contactors in a direction opposite to that required to pick up said polar contactor is limited to a low value by the high back resistance of said rectifier.

2. In a controller for switch machines, two line wires for operating said controller from a remote location, two polar contactors having front and back contacts said contactors selectively connected across said line wires, mechanical interlocking means for causing either of said contactors to close its back contact when the other of said contactors is energized to close its front contact, switch points associated with said switch machine and operable to either a normal or reverse position, a motor selectively energized to rotate in either direction through a front or back contact of one of said contactors and a back or front contact respectively of the other of said contactors, point detector contacts associated with said switch points and included in series with each of said polar contactors, one of said point detector contacts being open when said switch points are in either full reverse position and the other of said point detector contacts being open when said switch points are in full normal position and both closed at other times, whereby the direction of rotation of said motor may be changed in midstroke by reversing the polarity of the voltage applied to said line wires.

3. In a controller for operating a switch machine in accordance with the polarity of the energization applied to said controller, two polar contactors each of which is operable only by energization of a particular polarity and each of which is provided with front and back contacts, mechanical interlocking means for causing the closure of said back contact of either contactor upon the closing of said front contact of said other contactor, rectifying elements associated with the respective contactors of the type which present a large value of resistance to current flowing in one direction through said rectifier but a small value of resistance to current flowing in the opposite direction through said rectifier, switch points associated with said switch machine and operable to either a normal or reverse position, point detector contacts operated in accordance with the position of said switch points, line wires for transmitting polar control to said switch machine from a remote location, circuit means for connecting each of said contactors in series with one of said rectifying elements and one of said point detector contacts across said line wires, each of said rectifying elements being connected in series with the associated polar contactor in such a manner that when either of said polar contactors is supplied with current of the proper polarity to cause it to pick up said current will encounter the low forward resistance of said rectifier, said point detector contact connected in series with the last-actuated contactor being open and said point detector contact connected in series with the next-to-be-actuated contactor being closed, whereby when said switch machine is operated to either position a high resistance load consuming a small amount of power is connected across said line wires.

4. In a system for the remote control of a railroad track switch, line wires having energy of one polarity or the other impressed thereon in accordance with the desired position of the track switch, two polar cantactors, switch position contacts operable to normal, reverse and mid stroke positions, circuit means including switch position contacts for selectively connecting one or the other of said polar contactors across said line wires in accordance with the normal or reverse position of the track switch but effective to connect both said polar contactors in multiple across said line wires when said switch is in its mid stroke position, a rectifier unit connected in series with each polar contactor with such a polarity as to allow current to flow through that contactor only when the polarity is proper to cause the response of that contactor, mechanical means interlocking the armature of said two polar contactors to cause either of said contactors to close its back contacts when the other of said contactors is energized to close its front contacts, an electric switch operating motor, and circuit means controlled by the front and back contacts of both said polar contactors to govern the normal and reverse operation of said electric switch operating motor.

5. In a system for the remote control of a railroad track switch, line wires having energy of one polarity or the other impressed thereon in accordance with the desired position of the track switch, two polar contactors, switch position contacts operable to normal and reverse and mid stroke positions, circuit means including said switch position contacts for selectively connecting one or the other of said polar contactors across said line wires in accordance with the normal or reverse position of the track switch but effective to connect both said polar contactors in multiple across said line wires when said switch is in its mid stroke poisition, a rectifier unit connected in series with each polar contactor with such a polarity as to allow current to flow through that contactor only when the polarity is proper to cause the response of that contactor, mechanical means interlocking the armature of said two polar contactors to cause either of said contactors to close its back contacts when the other of said contactors is energized to close its front contacts, a pressure plate common to said two polar contactors for normally biasing their armatures to intermediate non-contact making positions, a normally closed contact connected to said pressure plate and opened when either of said polar contactors is operated to a front contact making position, an electric switch operating motor, circuit means controlled by the front and back contacts of said polar contactors to govern the normal and reverse operation of said electric switch operating motor, and circuit means controlled by said normally closed contact connected to said pressure plate for snubbing said motor near the end of each operation.

6. In a remote controller for switch machines, normal and reverse contactors for respectively controlling the normal and reverse operation of the switch machine, said contactors being mounted side by side and having armatures with cooperating front and back contacts, mechanical means for interlocking said armatures to cause either armature to assume a back contact making position when the other armature is operated to a front contact making position, a pressure plate common to both armatures and spring biased to tend to move both armatures toward their front contact making positions to thereby result in both armatures assuming a mid position in which neither front nor back contacts are made, said pressure plate being moved away from such mid position when either armature is operated to a front contacting position by reason of the action of said mechanical interlocking means acting upon the other armature, a contact finger mounted on said pressure plate and normally contacting a fixed contact when said pressure plate is in its mid position but with such contacting conditions ceasing when the pressure plate is moved away from that position upon the operation of the armature of either contactor, a normal operating circuit for a switch motor closed when said normal contactor is operated, a reverse operating circuit for the switch motor closed when the reverse contactor is operated, and a dynamic snubbing circuit closed by said contact finger on pressure plate when neither contactor is operated.

7. In a controller for switch machines, normal and reverse contactors mounted side by side and having armatures with cooperating front and back contacts, mechanical means for interlocking said armatures to cause them to operate to opposite positions from a mid position when either contactor is energized, a pressure plate common to both armatures and biased to tend to move both armatures toward their front contact making positions to cause them to normally be in mid positions, said pressure plate being moved away from such mid position when either armature is operated by reason of the action of said mechanical interlocking means, a contact mounted on said pressure plate and closed only while said pressure plate is in said mid position, a switch motor having an armature and two field windings, a normal operating circuit including said armature and one field winding controlled by the front contact of the normal contactor and the back contact of the reverse contactor, a reverse operating circuit for said switch motor including said armature and the other field winding controlled by the front contact of said reverse contactor and the back contact of said normal contactor, two rectifier units connected in series across the outer terminals of said two field windings with such a polarity of connection as to prevent current flow between such windings when either said normal or reverse operating circuits are closed, and circuit means including said pressure plate contact for connecting the mid point of said series connected rectifiers to the outer terminal of said armature to close a dynamic snubbing circuit when both said normal and reverse contactors are deenergized and their armatures assume said mid position.

8. In a controller for switch machines, normal and reverse contactors each having an armature with cooperating front and back contacts, said contactors being mounted side by side so that both armatures are operable in parallel planes, mechanical means including a pivoted interlocking arm connecting said two armatures to cause them to operate in opposite directions from a non-contacting mid position when either contactor is energized, a pressure plate common to both armatures and biased to tend to move both armatures toward their front contact making positions to cause them to normally be in non-contacting mid positions said pressure plate being moved away from such mid position when either armature is operated by reason of the action of said mechanical interlocking means, a contact finger mounted on said pressure plate and closed only while said pressure plate is in said mid position, a switch motor having an armature and an electromagnetic brake connected in series to the common point of a split field winding, said electromagnetic brake acting when deenergized to hold said motor in its then existing position, a normal operating circuit including a front contact of said normal contactor for connecting one terminal of a source to outer end of one field winding and a back contact of the reverse contactor for connecting the other terminal of the source to the electromagnetic brake, a reverse operating circuit including a front contact of said reverse contactor for connecting one terminal of a source to the outer terminal of the other field winding and a back contact of the normal contactor for connecting the other terminal of the source to the outer terminal of the electromagnetic brake, whereby said motor is operable in opposite directions depending upon whether the normal or reverse contactor is energized, two rectifier units connected in series across the outer terminals said split field winding with such a polarity of connection as to prevent current flow between such outer terminals when either said normal or reverse operating circuit is energized, and circuit means including said normally closed contact mounted on said pressure plate for normally connecting the mid point of said series connected rectifiers to that terminal of said armature connected to said electromagnetic brake to close a dynamic snubbing circuit near the end of each operation when the contactor causing that operation becomes deenergized, said snubbing circuit excluding said electromagnetic brake so that it will become effective to hold said motor as soon as it is brought to rest.

9. In a remote controller for a switch machine motor, normal and reverse contactors for respectively controlling the normal and reverse operation of the switch machine, mechanical means for interconnecting said contactors and causing them to normally assume non-contacting mid positions, mid position contact means operated by said mechanical means to close a contact only when said contactors are in said mid positions, normal and reverse operating circuits for the switch motor machine selectively governed by said normal and reverse contactors and a dynamic snubbing circuit closed at the end of each operation only when said mid position contact means is closed.

10. In a local control circuit organization for a switch machine operatively connected to a track switch, a pair of wires having one polarity or the other of current applied thereto in accordance with the position to which the switch machine is to be operated, two polar contactors each of which has two windings associated therewith, a rectifier included in series between the two windings of each of said contactors, a point detector contact mechanism operated in accordance with the position of the track switch and including contacts selectively closed for connecting the windings of one or the other of said polar contactors to said pair of wires or connecting the windings of both of said polar contactors across said wires in accordance with the normal or reverse position of the track switch but effective to connect the windings of both said contactors across said wires when the switch is in operation and is unlocked, and a switch machine operated to one position or the other in accordance with the particular one of said two polar contactors which is energized, whereby under normal conditions when said switch machine is not being operated the current to the windings of said contactor then connected across said pair of wires is held to a low value until the polarity of current applied to said pair of wires is reversed.

References Cited in the file of this patent

UNITED STATES PATENTS

| | | |
|---|---|---|
| 1,742,113 | Wenholz | Dec. 31, 1929 |
| 1,969,084 | Leake | Aug. 7, 1934 |
| 2,096,931 | Willing | Oct. 26, 1937 |
| 2,096,941 | Powell | Oct. 26, 1937 |
| 2,163,838 | Hines | June 27, 1939 |
| 2,360,092 | Young | Oct. 10, 1944 |
| 2,502,811 | Willing et al. | Apr. 4, 1950 |
| 2,604,581 | Johanek | July 22, 1952 |
| 2,644,120 | Swanton | June 30, 1953 |